INVENTORS
LUDWIG KLENK
DIETER KAEMPGEN
ROLF KERSTING
HERBERT PORRMANN

BY
ATTORNEYS 3,687,772
PROCESS FOR THE PRODUCTION OF A
LAMINATED SHEET MATERIAL
Ludwig Klenk, Hallgarten, Rheingau, Dieter Kaempgen, Weisbaden-Freudenberg, Rolf Kersting, Fulda, and Herbert Porrmann, Konigshofen, Germany, assignors to Kalle Aktiengesellschaft, Wiesbaden-Biebrich, Germany
Filed Dec. 19, 1968, Ser. No. 785,237
Claims priority, application Germany, Dec. 21, 1967,
P 16 35 532.1
Int. Cl. B29d 7/22, 13/04; B32b 31/08
U.S. Cl. 156—242                                         5 Claims

ABSTRACT OF THE DISCLOSURE

This invention relates to a process for the production of a laminated sheet material including a layer of textile material and a microporous layer of high-polymer plastic material wherein the surface of the laminate comprises polymeric material having a microporous structure provided with embossments. In the process, a solution of high-polymer plastic material is applied to a liquid- and gas-permeable auxiliary sheet material the surface of which has fine projections or depressions corresponding to the desired embossments, the polymer is precipitated on the auxiliary sheet material, a textile sheet material being applied to the layer of high-polymer material prior to precipitation or simultaneously therewith, or afterwards, and the laminate of polymer microporous layer and textile layer is separated from the auxiliary sheet material.

Figure 1:
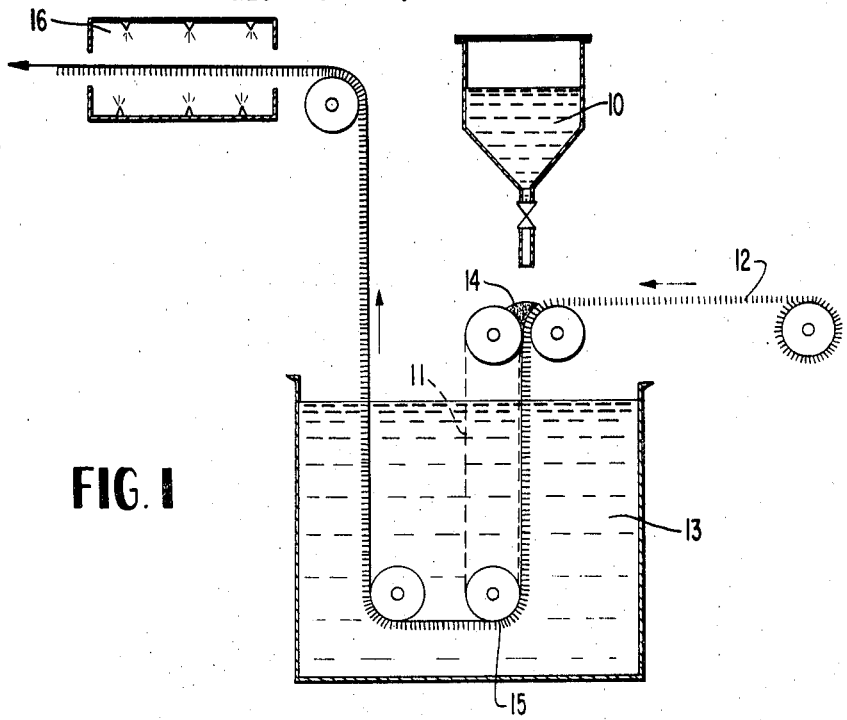

The present invention relates to a process for the production of a laminated sheet material comprising a layer of textile material and a microporous layer of high-polymer plastic material, with the laminate surface, which comprises microporous polymeric material, being provided with permanent embossments. According to known processes for the production of laminated materials, solutions of high-polymers are uniformly distributed on fleeces or fabrics and the solutions are precipitated and completely cured by removing the solvents, e.g. by washing out, vaporizing or other suitable measures.

It is also known to produce microporous layers by selecting the high-polymer substance, the solvents, and the methods for precipitating and curing. The following known processes are preferred for the production of polymer layers on textile substrates:

(1) Coating of textile substrates by means of knife coaters or rollers;
(2) Coating of textile substrates by means of slot dies;
(3) Coating of smooth or embossed auxiliary sheet materials with a solution of a high-polymer, simultaneous or subsequent application of a textile sheet material to the surface of the polymer layer, separation of the auxiliary sheet material, and curing of the polymer.

In order to obtain a uniform and flawless coating of fabric or fleece according to processes (1) and (2), it is necessary to use a substrate with a smooth and flawless surface. Coating commercial cotton or synthetic fabrics shows that it cannot be avoided that in the finished, coated material, the surface structure remains visible on the surface of the polymer layer turned away from the substrate.

Another adverse effect is that the fibers often project from the fabric. Similar difficulties occur in coating fleeces with polymeric coating compositions. Also in this case, a fleece surface structure, such as that obtained when reinforcing according to the known felt needling technique, often has an adverse effect.

Subsequent smoothening, e.g. by grinding, of the coated material is complicated and often impossible when coating with elastomers. In any case, a noticeable loss in quality and material is to be expected. Little use is made of the possibility of eliminating the appearance of the substrate structure, from the surface of the polymer layer turned away from the substrate, by employing very highly viscous coating compositions since the end product often tends to delaminate because the coating composition insufficiently penetrates into the substrate.

The disadvantages of the processes described under (1) and (2) are avoided when, according to process (3), the polymer layer is produced on an auxiliary sheet material and simultaneously or subsequently combined with the textile substrate. In the production of microporous polymer layers which are produced by coagulation of the polymer solution in a medium miscible with the solvent of the polymer solution but having a precipitating effect on the polymer, the process is disadvantageous in that the liquid having a coagulating effect reaches the polymer layer only from one side and thus requires long coagulation times.

Similar disadvantages are to be expected when the microporous structure is obtained by dissolving out solid or liquid components from the coating composition. The layers produced with an auxiliary sheet material according to the coagulation procedure have another important disadvantage in their microporous structure. Since the liquid having a coagulating effect acts upon the solution of the polymer only from the side facing away from the auxiliary sheet material, it results that on this side of the polymer layer, relatively coarse pores are formed. The thus produced laminates do not fulfill special requirements, as they must be fulfilled by a leather substitute for footwear uppers, with regard to permeation values and abrasion resistance.

The present invention provides a process for the production of a microporous sheet material which overcomes the disadvantages of the known processes and permits the application of permanent embossments to a surface of the sheet material, the polymer microporous sheet material being particularly suitable as a leather substitute for footwear uppers due to its permeation values and abrasion resistance.

The process for the production of a laminated sheet material including a layer of textile material and a microporous layer of high-polymer plastic material wherein the surface of the laminate, which comprises polymeric material having a microporous structure being provided with embossments, is characterized in that a solution of high-polymer plastic material is applied to a liquid- and gas-permeable auxiliary sheet material the surface of which has fine projections or depressions corresponding to the desired embossments, the polymer is precipitated on the auxiliary sheet material, a textile sheet material being applied to the layer of high-polymer material prior to precipitation or simultaneously therewith or afterwards, and the laminate of polymer microporous layer and textile layer is separated from the auxiliary sheet material.

The process is performed in a manner such that a polymeric coating composition is applied to a fine-meshed wire gauze serving as an auxiliary sheet material. In the performance of the process, it has proved advantageous to wet the metal gauze used as the auxiliary sheet material, prior to the application of the coating material, with the liquid used for precipitation or with another substance acting as a separating and precipitating agent; preferably wetted is the surface of the wire gauze to which the coating composition is applied. In some cases, it may be of advantage to add to the solution soluble, thickening substances, particularly methyl cellulose or polyacrylic acid. Wetting the auxiliary sheet material with the liquid prevents the coating composition from penetrating too deeply into the pores of the wire gauze with attendant complication of subsequent separation.

The polymeric coating composition comprises dissolved high-polymer substances, the solutions having a solids content from 20 to 40 percent by weight, preferably from 25 to 35 percent by weight, and a viscosity from 5,000 to 100,000 centipoises, preferably from 10,000 to 40,000 centipoises.

The thickness of the layer applied to 100 to 1,000μ, preferably 250 to 500μ.

The coating composition also may contain fillers and/or pigments. Such fillers may be added in amounts up to 50 percent by weight, calculated on the quantity of high-polymer material. Suitable fillers are, for example, cellulose powder, kaolin, titanium dioxide, or polyvinyl chloride. The surface of the polymeric compound on the sieve netting is then laminated with a textile sheet material, e.g. by pressing the textile sheet material against the pasty polymer layer using a roller under slight pressure. The composite material comprising the auxiliary sheet material, the polymer layer, and the textile sheet material is then exposed to a liquid which is miscible with the solvent of the polymer and precipitates the polymer, e.g. water.

The precipitating liquids are employed at a temperature from 20 to 90° C., preferably from 20 to 60° C., until the auxiliary sheet material can be separated from the polymer layer without damaging the latter. The laminate of the microporous polymer layer and the textile sheet material is then separated, freed from the residual solvent and precipitating agent, and wound up.

According to a modification of the process of the invention, the polymer coating composition is applied to the auxiliary sheet material, both are introduced together into a liquid suitable for precipitating the polymer, the precipitated polymer layer is separated from the auxiliary sheet material and then combined with a textile sheet material.

Preferable coating compositions are polyester or polyether urethane solutions having viscosities between 10,000 and 40,000 centipoises. Suitable solvents for the production of the high-polymer solutions are dimethyl acetamide, dimethyl sulfoxide and other known polar solvents for polyurethanes; particularly suitable, however, is dimethyl formamide.

Preferable auxiliary sheet materials are metal gauzes from stainless steel, copper or brass. Such a metal gauze may have a wire diameter of 0.1 to 0.02 mm. with a mesh density of 1,000 to 40,000, preferably between 10,000 and 30,000 meshes per square centimeter. The mean mesh value of such a gauze is 20 to 200μ.

Figure 2:
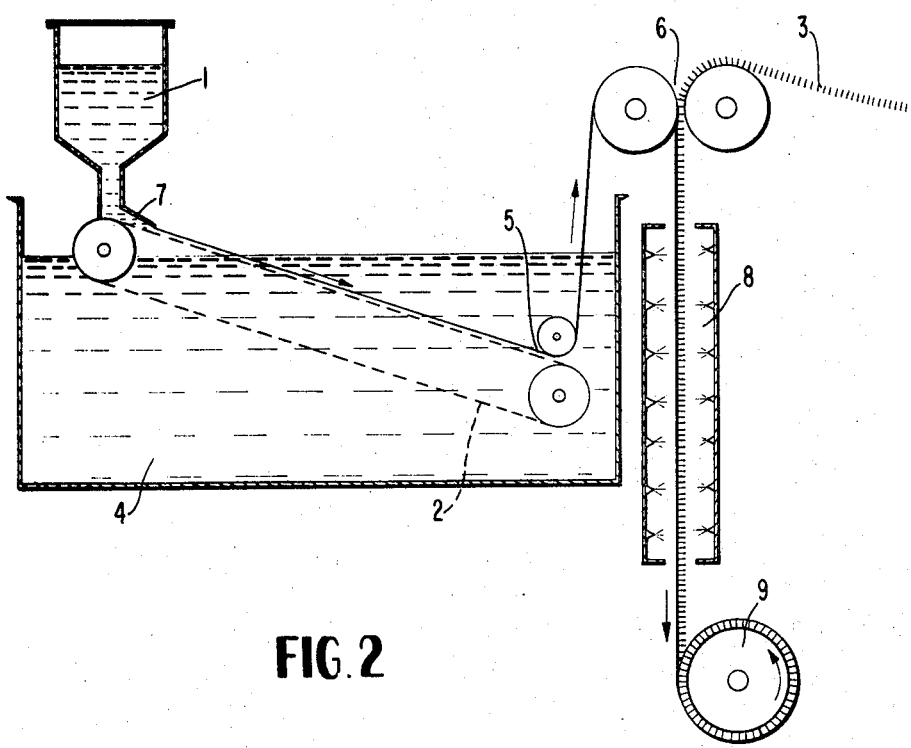

The present invention will be further illustrated by reference to the accompanying drawings in which:

FIG. 1 is a diagrammatic view of a preferred embodiment of the process of the invention according to which formation of the porous, self-supporting, high-polymer sheet material and lamination with a textile sheet material are performed in one process step, and FIG. 2 is a diagrammatic view of another modification of the process of the invention, according to which first porous, self-supporting, high-polymer sheet materials are produced and then laminated with a textile sheet material.

According to the method illustrated in FIG. 1, the polymer coating composition is combined with the textile substrate prior to precipitation; numeral 10 indicates the coating composition, numeral 11 a circulating sieve belt, numeral 12 a fleece web, numeral 13 a liquid precipitating bath, numeral 14 a pair of rollers with a lamination gap, numeral 15 the point at which the laminate is separated from the auxiliary supporting web, and numeral 16 indicates a drying channel.

In FIG. 2, numeral 1 indicates the polymer coating composition which is applied to the endless wire gauze 2 by means of the coating device 7 and which is precipitated in the liquid bath 4. The precipitated polymer layer 5 is removed from the circulating wire gauze 2 and conveyed to the lamination gap of the pair of rollers 6 and, in this lamination gap, combined with the textile sheet material 2. After drying the laminate in the drying channel, the finished laminate is wound-up on the reel 9.

It will be obvious to those skilled in the art that many modifications may be made within the scope of the present invention without departing from the spirit thereof, and the invention includes all such modifications.

What is claimed is:

1. A process for the production of a laminated sheet material including a layer of textile material and a microporous layer of high-polymer plastic material wherein a surface of the laminate comprises polymeric microporous material being provided with permanent embossments, which process comprises; providing a fine mesh wire gauze as an auxiliary sheet material, wetting said wire gauze sheet material with a liquid used as a separating and precipitating agent, applying a solution layer of high-polymer plastic material to said fine mesh wire gauze, applying a layer of textile sheet material to the solution layer to form a laminate therewith, precipitating the polymer layer on the fine mesh wire gauze auxiliary sheet by immersing the laminate on the auxiliary sheet in a liquid which is miscible with the solvent of the polymer, and separating the laminate of the precipitated microporous plastic layer and the textile layer from the auxiliary sheet material.

2. A process according to claim 1 in which the polymer material is polyurethane.

3. A process according to claim 1 in which the polymer material includes polyvinyl chloride as a filler.

4. A process according ot claim 1 in which the precipitating agent contains a soluble thickening substance.

5. A process according to claim 1 in which the fine mesh wire gauze is a metal gauze from stainless steel, copper, or brass.

References Cited

UNITED STATES PATENTS

| 2,983,960 | 5/1961 | Jilge | 156—155 X |
|---|---|---|---|
| 3,418,198 | 12/1968 | Einstman | 156—285 X |
| 3,516,883 | 6/1970 | Harper | 156—247 X |
| 3,527,653 | 9/1970 | Sommer et al. | 117—62.2 |
| 3,529,049 | 9/1970 | Abell et al. | 156—247 X |
| 2,813,052 | 11/1957 | Lancaster | 156—247 |
| 2,842,473 | 7/1958 | Oberly et al. | 156—249 X |
| 3,123,508 | 3/1964 | Waugh | 156—247 X |
| 3,256,121 | 6/1966 | Abell | 156—247 X |
| 3,330,713 | 7/1967 | Watson et al. | 156—247 X |

FOREIGN PATENTS

| 708,055 | 4/1954 | Great Britain | 156—247 |

ROGER GAITHER, Primary Examiner

U.S. Cl. X.R.

117—67.2; 156—231, 246, 247